United States Patent
Williams et al.

(10) Patent No.: US 7,311,740 B2
(45) Date of Patent: Dec. 25, 2007

(54) SNAP ACTING SPLIT FLAPPER VALVE

(75) Inventors: Mark W. Williams, Phoenix, AZ (US); Robert D. Sleeper, Laveen, AZ (US); Don J. Atkins, Chandler, AZ (US); Stuart K. Denike, Phoenix, AZ (US)

(73) Assignee: Honeywell International, Inc., Morristown, NJ (US)

( * ) Notice: Subject to any disclaimer, the term of this patent is extended or adjusted under 35 U.S.C. 154(b) by 292 days.

(21) Appl. No.: 11/058,060

(22) Filed: Feb. 14, 2005

(65) Prior Publication Data

US 2006/0179800 A1   Aug. 17, 2006

(51) Int. Cl.
*B01D 46/00* (2006.01)
*F16K 17/00* (2006.01)

(52) U.S. Cl. .................. 55/312; 55/313; 137/512.1; 137/512.5; 137/527

(58) Field of Classification Search ............ 55/309, 55/312, 313; 96/399, 400, 401; 137/469, 137/470, 471, 472, 476, 484.2, 494, 511, 137/522, 527, 512.1, 512.15, 512.2, 599.14; 251/12, 73, 212; 454/71, 76
See application file for complete search history.

(56) References Cited

U.S. PATENT DOCUMENTS

| | | | |
|---|---|---|---|
| 3,452,778 A | | 7/1969 | Babcock |
| 3,538,946 A | * | 11/1970 | Hilsheimer ............... 137/512.1 |
| 3,640,306 A | | 2/1972 | Vogt |
| 3,685,794 A | * | 8/1972 | Henning ..................... 251/303 |
| 3,913,833 A | * | 10/1975 | Minett et al. ............... 236/49.3 |
| 4,005,732 A | | 2/1977 | Buckner |
| 4,043,358 A | | 8/1977 | Sliski |
| 4,079,751 A | * | 3/1978 | Partridge et al. ...... 137/516.29 |
| 4,196,745 A | | 4/1980 | Schutzer |
| 4,249,567 A | | 2/1981 | Weiss |
| 4,445,533 A | * | 5/1984 | DeFrees ................... 137/512.1 |
| 4,467,824 A | | 8/1984 | Strulik et al. |
| 4,607,661 A | | 8/1986 | Wessels et al. |
| 4,694,853 A | | 9/1987 | Goodwin |
| 4,702,075 A | | 10/1987 | Jenny |
| 5,301,709 A | | 4/1994 | Gasaway |
| 5,305,985 A | * | 4/1994 | Fendley et al. ............... 251/85 |
| 5,381,821 A | * | 1/1995 | Muddiman ............... 137/454.2 |
| 5,392,810 A | | 2/1995 | Cooper et al. |
| 5,501,716 A | * | 3/1996 | Chiba et al. .................. 96/400 |
| 5,516,330 A | * | 5/1996 | Dechow et al. ............... 454/74 |

(Continued)

FOREIGN PATENT DOCUMENTS

DE              948235          1/1964

(Continued)

*Primary Examiner*—Duane Smith
*Assistant Examiner*—Robert A Clemente
(74) *Attorney, Agent, or Firm*—Ingrassia Fisher & Lorenz

(57) ABSTRACT

A filter bypass valve is disposed in parallel with an aircraft cabin air filtration system air filter. During normal operation, air is filtered through the air filter at an air flow that meets air flow requirements of the system. The bypass valve is designed to remain closed during normal use, and to open if the differential pressure across the air filter reaches a predetermined opening differential pressure to allow airflow to be partially or fully diverted around the air filter.

20 Claims, 3 Drawing Sheets

U.S. PATENT DOCUMENTS

| | | | |
|---|---|---|---|
| 5,681,218 A | * 10/1997 | Kishi et al. | 454/75 |
| 5,819,790 A | 10/1998 | Cooper | |
| 5,954,577 A | * 9/1999 | Meckler | 454/75 |
| 6,012,483 A | 1/2000 | Beddies | |
| 6,079,211 A | 6/2000 | Woollenweber et al. | |
| 6,235,192 B1 | 5/2001 | Melfi et al. | |
| 6,679,374 B2 | 1/2004 | Garrill et al. | |
| 6,796,327 B2 | 9/2004 | Bodnar | |
| 2003/0089404 A1 | 5/2003 | Bodnar | |

FOREIGN PATENT DOCUMENTS

| | | |
|---|---|---|
| DE | 3732655 A1 | 4/1989 |
| DE | 296 17 099 U1 | 1/1997 |
| EP | 06 25 0759 | 5/2006 |
| JP | 57171170 A | 10/1982 |

* cited by examiner

SNAP ACTING SPLIT FLAPPER VALVE

TECHNICAL FIELD

The present invention relates generally to aircraft cabin air filtration system, and more particularly to a split flapper valve that bypasses air to flow around an air filter in the system in the event the air filter is unable to meet the system air flow requirements.

BACKGROUND

Many aircraft use an aircraft cabin air filtration system to clean the cabin air. These systems usually include an air filter, such as a hepa-filter, that cleans the air but may become obstructed during use, thereby providing reduced airflow. In these situations, the cabin air filtration system may be unable to meet the system air flow requirements. In some instances, the air filter is an optional component of the system, so it may not be regularly serviced. Should the air filter become obstructed, it may not be noticed that there is inadequate airflow through the system. And even if it is noticed, there may not be time or resources to clean or replace the air filter, especially during flight.

Accordingly, there is a need to provide a filter bypass device in the aircraft cabin air filtration system to meet the air flow requirements in case where the air filter becomes obstructed. In addition, it is desirable that the filter bypass device operate automatically when the air filter becomes obstructed. Furthermore, other desirable features and characteristics of the present invention will become apparent from the subsequent detailed description and the appended claims, taken in conjunction with the accompanying drawings and the foregoing technical field and background

BRIEF SUMMARY

The present invention provides a way to bypass an air filter in an aircraft cabin air filtration system if the air filter is unable to meet the airflow requirements for the system. To accomplish this, a filter bypass valve is placed in parallel with the air filter. During normal operation, air is filtered through the air filter at an air flow that meets air flow requirements of the system. The filter bypass valve is designed to remain closed during normal use and only opens at a specific cracking pressure to allow airflow around the air filter only if the air filter cannot maintain adequate airflow flow, such as during "hot phase" or becomes obstructed or plugged.

In one embodiment, and by way of example only, an aircraft cabin air filtration system includes an inlet, an outlet, an air filter, and a bypass valve. The inlet is configured to receive a flow of air from an airflow source, and the outlet is configured to exhaust the flow of air to the aircraft cabin. The air filter is positioned between the inlet and the outlet, is fluidly coupled to the inlet and the outlet, and is configured to filter the flow of air, whereby a differential pressure is developed between the inlet and the outlet. The bypass valve is positioned between the inlet and the outlet and in parallel with the air filter. The bypass valve is fluidly coupled to the inlet and the outlet is and movable between an open position, in which the flow of air is bypassed around the filter, and the closed position, in which the flow of air is not bypassed around the filter. The bypass valve is configured to move to the open position when the differential pressure magnitude reaches a predetermined opening value, and includes a valve body and one or more flappers. The valve body has one or more flow channels extending therethrough, each flow channel having a cross sectional flow area. The one or more flappers are rotationally mounted on the valve body and are configured to substantially seal the flow channels when the bypass valve is in the closed position and unseal the flow channels when the bypass valve is in the open position. The cross sectional flow area is less than about 50% of the surface area of each flapper.

In yet another exemplary embodiment, a valve includes a valve body, one or more flappers, an annular shroud, and one or more flapper stops. The valve body has one or more flow channels extending therethrough. The one or more flappers are rotationally mounted on the valve body and rotationally movable between a closed position and an open position. Each flapper is configured to substantially seal one of the flow channels when it is in the closed position and to rotate to at least a predetermined rotational angle relative to its closed position when it is in the open position. The annular shroud is coupled to and extends axially from the valve body, and surrounds each flapper when the flapper is in the closed position. The one or more flapper stops are coupled to the valve body and are configured to limit the predetermined rotational angle of each flapper to less than 90-degrees.

Other independent features and advantages of the system and valve will become apparent from the following detailed description, taken in conjunction with the accompanying drawings which illustrate, by way of example, the principles of the invention.

BRIEF DESCRIPTION OF THE DRAWINGS

The following drawings are illustrative of the particular embodiments of the invention and therefore do not limit its scope. They are presented to assist in providing a proper understanding of the invention. The drawings are not to scale and are intended for use in conjunction with the explanations in the following detailed descriptions. The present invention will hereinafter be described in conjunction with the appended drawings, wherein like reference numerals denote like elements, and.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
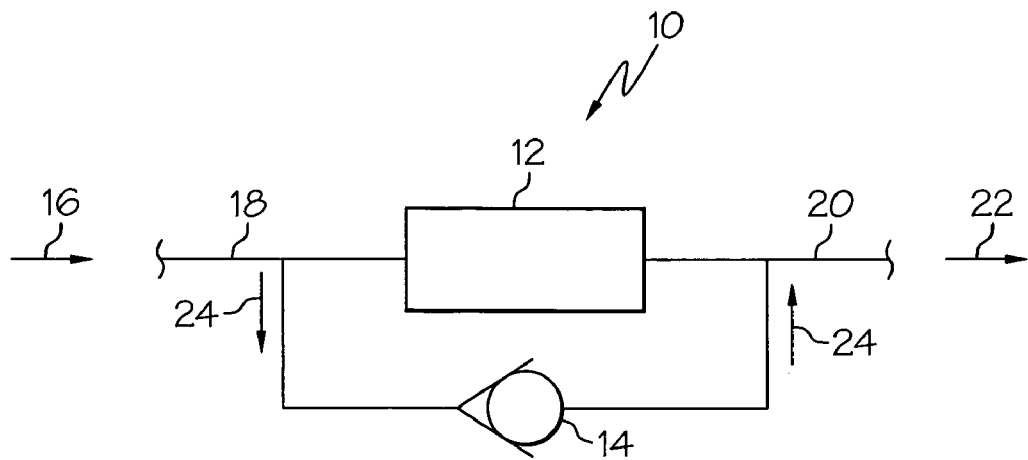
FIG. 1 is a simplified schematic diagram illustrating a portion of an aircraft cabin air filtration system having an air filter and a filter bypass valve.

FIG. 1 is a simplified schematic diagram illustrating a portion of an aircraft cabin air filtration system 10 that includes an air filter 12 and a filter bypass valve 14 positioned in parallel between an inlet duct 18 and an outlet duct 20. During normal operation, air is filtered through air filter 12 at an air flow rate that meets predetermined air flow requirements of system 10. Filter bypass valve 14 is movable between a closed position, in which no air flows through the filter bypass valve 14, and an open position, in which air flows through the filter bypass valve 14. The bypass valve 14 is configured to be in the closed position during normal system 10 operation, and to move to the open position if the differential pressure across the air filter 12 reaches a predetermined opening value. If the differential pressure across the air filter 12 reaches the predetermined opening value, the likely cause is that the filter is clogged or otherwise obstructing air flow between the inlet duct 18 and outlet duct 20, or the system is operating in so-called "hot phase," or a relatively extreme high flow condition. No matter the specific reason for the increased differential pressure across air filter 12, when filter bypass valve 14 moves to the open position, air flows around air filter 12 to maintain adequate airflow through the system 10.

During system operation, upstream air enters inlet duct 18 from, for example, the cabin recirculation supply 16 at a first pressure $P_1$. The air flows through inlet duct 18, into and through air filter 12 where the air is filtered, and then into and through outlet duct 20. The air in outlet duct 20 is discharged to, for example, the aircraft cabin 22. As the air flows through air filter 12, it experiences a pressure drop. Thus, the air flowing into and through outlet duct 20 is at a second, lower pressure $P_2$, resulting in a differential pressure (e.g., $P_1$-$P_2$) across air filter 14.

As was noted above, filter bypass valve 14 is also connected to inlet duct 18 and outlet duct 20. Thus, filter bypass valve 14 is exposed to the differential pressure across air filter 12. Filter bypass valve 14 is preferably a check valve, and is disposed within the system to prohibit reverse air flow from the outlet duct 20 to the inlet duct 18. In the event that air flow through air filter 12 is inhibited due, for example, to air filter 12 becoming clogged, the differential pressure across air filter 12 will increase. As was noted above, should the differential pressure magnitude increase to the predetermined opening value, filter bypass valve 14 moves to the open position, and bypasses air around air filter 12.

Once filter bypass valve 14 moves to the open position, upstream air flow 16 in inlet duct 18 is diverted, or partially diverted, around air filter 12, and flows through filter bypass valve 14. After flowing through filter bypass valve 14, the bypass airflow 24 returns to outlet duct 20 and the aircraft cabin 22. Preferably, when filter bypass valve 14 is in the open position, it is configured to have a minimal pressure drop across it, and is additionally designed to stay in the open position until the differential pressure magnitude (e.g., $P_1$- $P_2$) drops below a predetermined closing value.

Air filter 12 and filter bypass valve 14 are typically positioned near the inside of the aircraft cabin. Thus, when working properly, air filter 12 and filter bypass valve 14 should not create undesirable levels or types of noise. Because of this, when filter bypass valve 14 is in the open position, it is configured to prevent so-called "valve flutter," which in addition to being a noise nuisance, also creates wear and tear on filter bypass valve 14 components. As such, filter bypass valve 14 is designed to "snap" open and not flutter during use. A detailed description of a particular physical embodiment of filter bypass valve 14 that is configured to provide these characteristics will now be provided.

Figure 2:
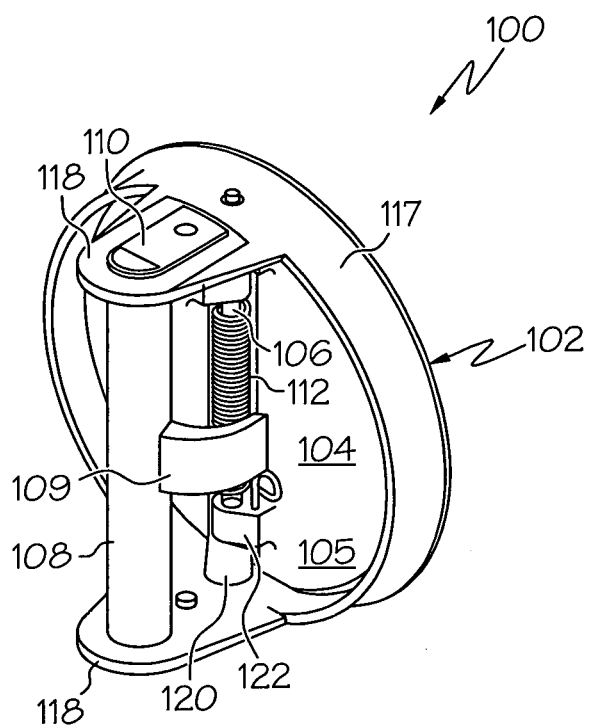
FIG. 2 is a perspective view showing one embodiment of a split flapper valve.
Figure 3:
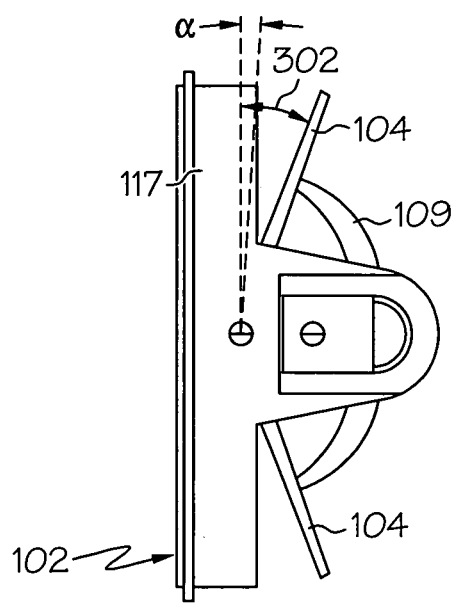
FIG. 3 is a side view of the split flapper valve.

With reference to FIGS. 2 and 3, a perspective view and a side view, respectively, of a split flapper check valve ("valve") 100 for use as a filter bypass valve, such as filter bypass valve 14, is shown. Valve 100 includes a valve body 102, one or more flappers 104, a hinge pin 106, a stop mount 108, one or more flapper stops 109, a retainer pin 110, and one or more torsion springs 112. Valve body 102 is annular in shape and includes an annular shroud 117 and a pair of mounting flanges 118 that extend from the annular shroud 117. The annular shroud 117 surrounds flappers 104 and extends axially from the valve body 102 in a downstream direction.

Each mounting flange 118 has a hole for rotationally mounting hinge pin 106 therein, and fixedly mounting stop mount 108 therein. Flappers 104 are coupled to rotationally mounted hinge pin 106 via lugs 120, 122, to thereby facilitate flapper rotational movement between a closed position and an open position. Spring 112 is a torsion spring that is disposed within valve body 102 and is configured to hold flappers 104 in the closed position and resist rotation to the open position. A split flapper with two flappers 104 is shown but is not essential to the invention. Indeed, other embodiments of the invention may have only one flapper 104. Moreover, while a single torsion spring 112 is used in the depicted embodiment, valve 100 could be implemented with two or more torsion springs 112.

Stop mount 108 is held in place with retainer pin 110. Flapper stops 109 are coupled to the stop mount 108 and are configured to limit the rotational movement of flappers 104 in the open position. As shown most clearly in FIG. 3, flapper stops 109 limit rotational movement of flappers 104 to a rotational angle of less than 90-degrees. As will be described in more detail further below, by configuring flapper stops 109 to limit flapper rotational movement to less than 90-degrees, valve flutter can be prevented.

Figure 4:
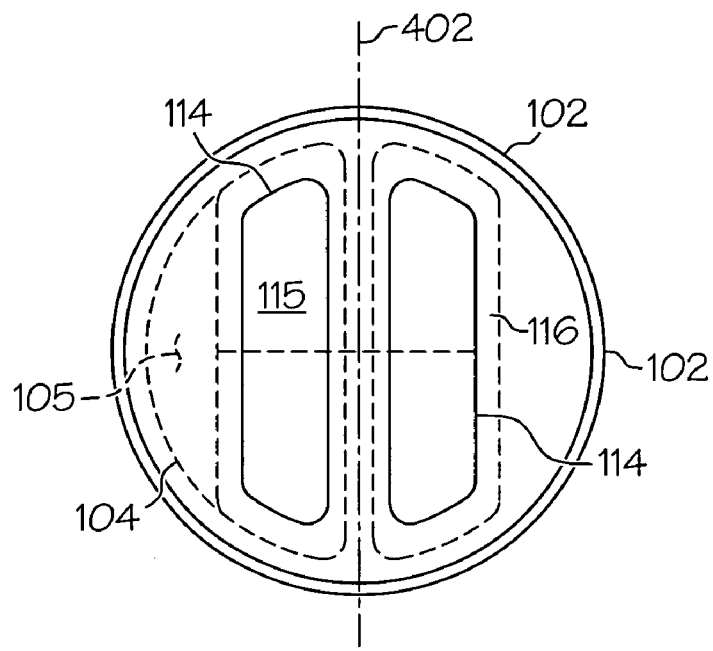
FIGS. 4 and 5 are front views of the split flapper valve showing the first side or pressure side of the split flapper check valve.

Turning now to FIG. 4, a front view of valve 100 is provided. Valve body 102, as was noted above, is annular shaped, and includes one or more openings or flow channels 114 that extend therethrough, there being one flow channel 114 for each flapper 104. A valve seat 116 surrounds each flow channel 114. In the depicted embodiment each valve seat 116 is implemented as a raised surface that flapper 104 contacts in the closed position to provide a metal-to-metal seal. It will be appreciated that in an alternative embodiment, valve seat 116 could have a relatively soft material such as, for example, a silicone O-ring disposed therein or coupled thereto, to implement a relatively softer seat and seal.

Figure 5:
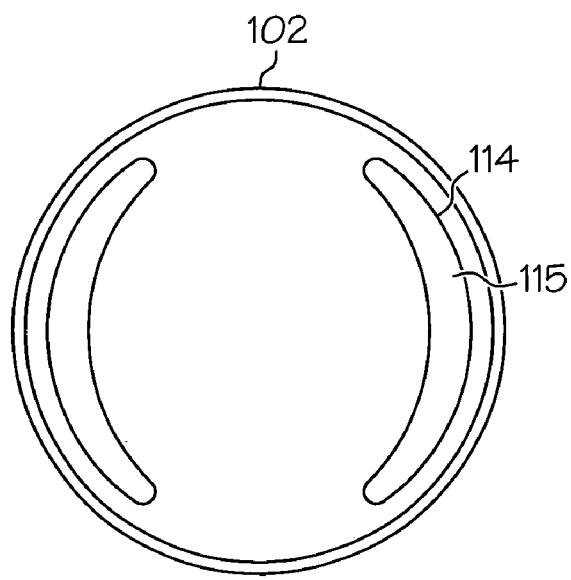

In the embodiment shown in FIG. 4, each flow channel 114 has a cross sectional shape that is a substantially rectangular parallelogram that is disposed near a centerline 402 of valve body 102. It will be appreciated that this is merely exemplary, and that flow channels 114 could have different cross sectional shapes. For example, in the alternative embodiment shown in FIG. 5, flow channels 114 have a substantially crescent cross sectional shape and are disposed near the periphery of valve body 102.

No matter the specific cross sectional shape of each flow channel, valve 100, as previously noted, is configured to open when a differential pressure of a predetermined opening value exists across valve 100. There are various factors that determine the predetermined opening differential pressure value that will cause valve 100 to begin opening. Included among these factors are the flow channel 114 size and spring 112 torsion load. Changing flow channel 114 size changes the area of flapper 104 that is exposed to upstream pressure when valve 100 is in the closed position, which in turn changes the force applied to flapper 104 in the closed position. The torsion load of spring 112 may be varied by selecting a spring with a higher or lower torsion. By balancing flow channel 114 size with spring 112 torsion, valve 100 may be designed to begin opening at a desired differential pressure value.

The force urging flappers 104 to the open position is equal to the upstream air pressure (e.g., $P_1$) times the area of flappers 104 exposed to the upstream air pressure. The force urging flappers 104 to the closed position is equal to the downstream air pressure (e.g., $P_2$) times the area of flappers exposed to the downstream pressure, plus the torsion load supplied from spring 112. In the closed position, the area of each flapper 104 exposed to upstream air pressure is the cross sectional flow area 115 (first cross sectional flow area) of each flow channel 114. As the differential pressure value across flappers 104 increases, the net force acting on flappers 104 eventually overcomes spring 112 torsional force in the closed position. As a result, flapper 104 moves away from flow channel 114, toward the open position.

After the initial movement of flappers 104 toward the open position, bypass air flow 24 begins flowing into and through valve 100, which results in a drop in upstream pressure ($P_1$), and thus the differential pressure across filter 12, due to the larger flow area made available to the source of inlet air 18. In addition, as flappers 104 begin moving away from the closed position toward the open position, the torsional force from spring 112 will increase an amount proportional to the spring rate of spring 112. However, once flappers 104 begin moving toward the open position, the entire surface area 105 (second area) of each flapper 104, which is significantly larger than the first cross sectional flow area 115, is now exposed to the upstream pressure. Since the exposed area of flappers 104 has increased relative to the closed position, the net force acting upon the flappers 104 also has increased. This sudden increase in force "snaps" flappers 104 to the open position against flapper stops 109, which compensates for the drop in differential pressure across filter 12 upon valve 100 opening, and for the increased torsional force from spring 112 as flappers 104 move further from the closed position.

It will be appreciated that the flow channel cross sectional flow area 115 and flapper surface area 105 may vary to achieve the desired opening differential pressure value. Preferably, however, the cross sectional flow area 115 is less than about 50% of the surface area 105, though the specific value may vary depending on various factors, such as flow channel cross sectional shape. For example, in the embodiment depicted in FIG. 4, the cross sectional flow area 115 of each channel 114 is about 40% of the surface area 105 of each flapper 104, and in the embodiment depicted in FIG. 5, the cross sectional flow area 115 of each channel 104 is about 20% of the surface area of each flapper 104.

The configuration of the annular shroud 117 and valve stops 109 also enhances the snap action of flappers 104 and, as was alluded to previously, additionally helps prevent valve flutter. The annular shroud 117, as was noted above, extends axially downstream of the flow channels 114, and valve stops 109 limit rotation of flappers 104 an amount that maintains a sufficient differential pressure value across valve 100 to keep flappers 104 open against valve stops 109 while meeting system airflow requirements. As FIGS. 2 and 3 illustrate, the annular shroud 117 is configured to surround each flapper 104 when valve 100 is in the closed position, and extends axially downstream such that it continues to surround each flapper 104 up to a predetermined partial-open angle (α) between the closed and open position. Moreover, valve stops 109 and annular shroud 117 are configured such that annular shroud 117 partially surrounds each flapper 104 when valve 100 is in the open position. It will be appreciated that the value of the partial-open angle (α) may vary to achieve the desired valve opening characteristics, which will now be described in more detail.

Figure 6:
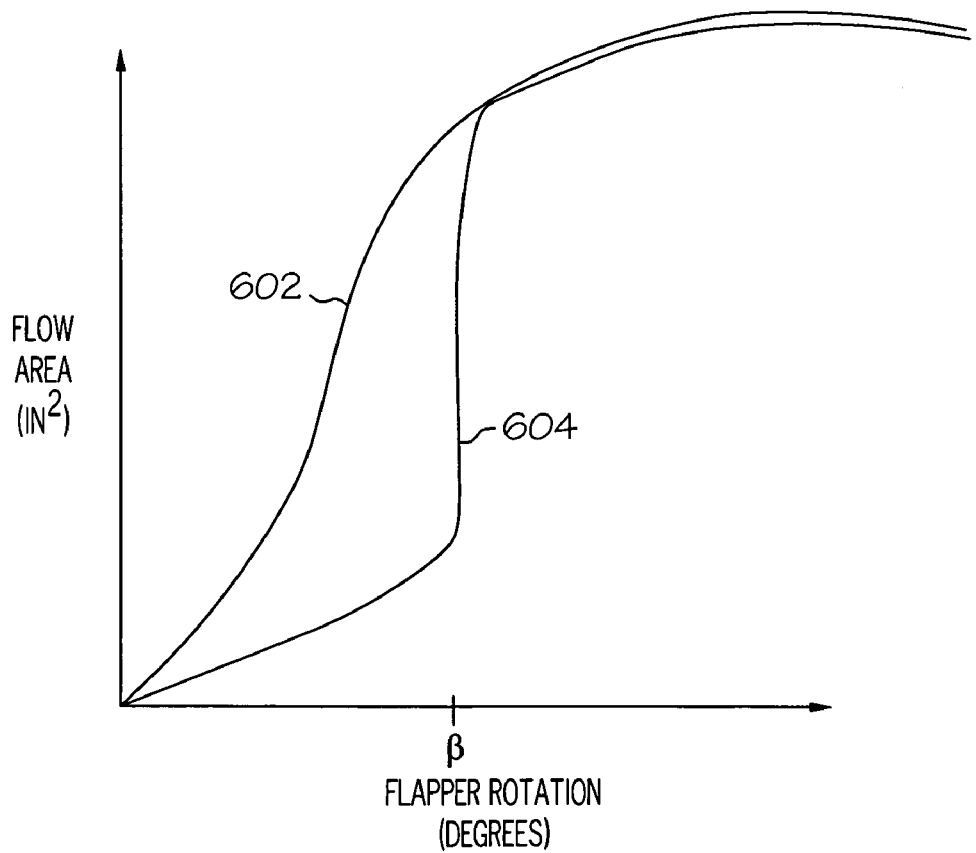
FIG. 6 is a generalized graph depicting flow area versus flapper rotation for a conventional flapper valve and the flapper valve shown in FIGS. 1-4.

With the above-described configuration, annular shroud 117 and valve stops 109 cause valve 100 to have opening characteristics that differ significantly from presently known flapper valves, which do not include annular shroud 117. Specifically, annular shroud 117 significantly reduces the flow-area-to-flapper-stroke gain of valve 100 as compared to these presently known valves. This is shown more clearly in FIG. 6, which is a graph of flow area versus flapper rotation for a conventional flapper valve 602 and a flapper valve 604, such as valve 100, including annular shroud 117. As this graph shows, the flow-area-to-flapper-stroke gain of the conventional flapper valve 602 is significantly larger than for the flapper valve 604 with annular shroud 117, at least until flapper rotation reaches a predetermined rotational angle (β). Once the predetermined rotational angle (β) is reached, the flow-area-to-flapper-stroke gains are substantially identical. As such, valve stops 109, as discussed in more detail further below, limit the rotational angle 302 (see FIG. 3) of flappers 104 to less than or equal to the predetermined rotational angle (β).

The initially low flow-area-to-flapper-stroke gain of valve 100 occurs because annular shroud 117, between the shut position (e.g., zero flapper rotation) and the predetermined rotational angle (β), causes valve 100 to present less flow area to the source of inlet air 18. Nonetheless, valve 100 does present some increased flow area, which does cause a sudden decrease in upstream pressure ($P_1$). However, annular shroud 117 significantly reduces the amount that upstream pressure ($P_1$) decreases. This, in combination with valve stops 109, results in valve 100 snapping to, and remaining in, the open position without experiencing the valve flutter that can result from relatively small changes in differential pressure. Once valve 100 opens, it will remain in the open position until the differential pressure across valve 100 reaches a predetermined closing differential pressure value.

It will be appreciated that the amount of rotational movement to which valve stops 109 limit flapper rotational movement may vary depending, for example, on the cross sectional shape and flow area of flow channels 114. For example, in the embodiment depicted in FIG. 4, in which the cross sectional shape is a substantially rectangular parallelogram, valve stops 109 limit flapper rotational movement to about 32-degress. Alternatively, for the embodiment depicted in FIG. 5, in which the cross sectional shape is substantially crescent shaped, valve stops 109 limit rotational movement to about 16-degrees.

With the above-described valve configuration, once flappers 104 begin to open there is relatively more flapper area 105 for the upstream pressure to act against, and a relatively low upstream pressure drop due to the relatively low flow-area-to-flapper-rotation gain of valve 100, thus flappers 104 are pressure loaded in the open position and quickly snap open onto flapper stops 109. In addition, because of this additional area, the differential pressure value at which flappers 104 will return to the closed position (e.g., the predetermined closing differential pressure) will be sufficiently lower than the predetermined opening differential pressure value, thereby providing opening-closing hysteresis, as well as preventing valve flutter and chatter of flappers 104 against valve seats 116.

If the differential pressure across valve 100 is reduced to the predetermined closing value, the torsional force of torsion spring 112 will cause flappers 104 to "snap" back to the closed position against seats 116. This "snap" action between the open and closed positions insures that flappers 104 are either against the seat 114 or against the stops 109 and do not experience valve flutter. The valve 100 includes various features that enhance its snap action characteristics (both opening and closing) and its non-flutter characteristics.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. An aircraft cabin air filtration system comprising:
   an inlet configured to receive a flow of air from an airflow source;
   an outlet configured to exhaust the flow of air to the aircraft cabin;
   an air filter positioned between the inlet and the outlet, the air filter being fluidly coupled to the inlet and the outlet and configured to filter the flow of air, whereby a differential pressure is developed between the inlet and the outlet; and
   a bypass valve positioned between the inlet and the outlet and in parallel with the air filter, the bypass valve being fluidly coupled to the inlet and the outlet and movable between an open position, in which the flow of air is bypassed around the filter, and the closed position, in which the flow of air is not bypassed around the filter, the bypass valve configured to move to the open position when the differential pressure magnitude reaches a predetermined opening value, the filter bypass valve including:
   a valve body having one or more flow channels extending therethrough, each flow channel having a cross sectional flow area, and
   one or more flappers rotationally mounted on the valve body and configured to substantially seal the flow channels when the bypass valve is in the closed position and unseal the flow channels when the bypass valve is in the open position, each flapper having a surface area,
   wherein the cross sectional flow area is less than about 50% of the surface area.

2. The system of claim 1, wherein the predetermined opening differential pressure value is the differential pressure across the filter at which the air filter is unable to meet a predetermined air flow rate.

3. The system of claim 1, wherein the bypass valve further includes:
   one or more torsion springs coupled to the flappers, each torsion spring having a torsional force configured to urge at least one flapper toward the closed position.

4. The system of claim 1, wherein each flapper moves rotationally between the valve open and closed positions, and wherein the bypass valve further includes:
   one or more flapper stops coupled to the valve body and configured to limit rotational movement of each flapper in the open position.

5. The system of claim 4, wherein the flapper stop limits rotational movement of the flappers to a rotational angle of less than about 90-degrees.

6. The system of claim 5, wherein:
   each flow channel has a cross sectional shape that is a substantially rectangular parallelogram; and
   the flapper stop limits rotational movement of the flappers to a rotational angle of about 32-degrees.

7. The system of claim 6, wherein:
   the valve body includes an upstream surface having a centerline; and
   the valve includes two flow channels symmetrically disposed on the valve body upstream surface on opposite sides of, and adjacent to, the centerline.

8. The system of claim 5, wherein:
   each flow channel has a cross sectional shape that is substantially crescent shaped; and
   the flapper stop limits rotational movement of the flappers to a rotational angle of about 16-degrees.

9. The system of claim 8, wherein:
   the valve body includes an upstream surface having a centerline and an outer periphery; and
   the valve includes two flow channels symmetrically disposed on the valve body upstream surface on opposite sides of the centerline and adjacent the valve body outer periphery.

10. The system of claim 1, further comprising:
    an annular shroud coupled to, and extending axially from, the valve body.

11. The system of claim 10, wherein the annular shroud is configured to surround each flapper when the valve is in the closed position.

12. The system of claim 11, wherein the annular shroud is configured to at least partially surround each flapper when the valve is in the open position.

13. A valve, comprising:
    a valve body having one or more flow channels extending therethrough, each flow channel having a cross sectional flow area;
    one or more flappers rotationally mounted on the valve body and rotationally movable between a closed position and an open position, each flapper configured to substantially seal one of the flow channels when it is in the closed position and to rotate to at least a predetermined rotational angle relative to its closed position when it is in the open position, each flapper having a surface area;
    an annular shroud coupled to and extending axially from the valve body, the annular shroud surrounding each flapper when the flapper is in the closed position; and
    one or more flapper stops coupled to the valve body and configured to limit the predetermined rotational angle of each flapper to less than 90-degrees,
    wherein the cross sectional flow area is less than about 50% of the surface area.

14. The valve of claim 13, further comprising:
    one or more torsion springs coupled to the flappers, each torsion spring having a torsional force configured to urge at least one flapper toward the closed position.

15. The valve of claim 13, further comprising:
    each flow channel has a cross sectional shape that is a substantially rectangular parallelogram; and
    each flapper stop limits rotational movement of a flapper to a rotational angle of about 32-degrees.

16. The valve of claim 13, wherein:
    the valve body includes an upstream surface having a centerline; and the valve includes two flow channels symmetrically disposed on the valve body upstream surface on opposite sides of, and adjacent to, the centerline.

17. The valve of claim 13, wherein:

each flow channel has a cross sectional shape that is substantially crescent shaped; and the flapper stop limits rotational movement of the flappers to a rotational angle of about 16-degrees.

18. The valve of claim 17, wherein:

the valve body includes an upstream surface having a centerline and an outer periphery; and the valve includes two flow channels symmetrically disposed on the valve body upstream surface on opposite sides of the centerline and adjacent the valve body outer periphery.

19. The valve of claim 13, wherein the annular shroud is configured to surround each flapper when the flapper is between the closed position and a predetermined partial-- open angle, the predetermined partial-open angle having a magnitude less than the predetermined rotational angle in the open position.

20. A valve, comprising:

a valve body having one or more flow channels extending therethrough, each flow channel having a cross sectional flow area; and one or more flappers rotationally mounted on the valve body and rotationally movable between a closed position and an open position, each flapper configured to substantially seal one of the flow channels when it is in the closed position and to rotate to at least a predetermined rotational angle relative to its closed position when it is in the open position, each flapper having a surface area, wherein the cross sectional flow area is less than about 50% of the surface area.

* * * * *